(12) United States Patent
Miyagawa et al.

(10) Patent No.: US 9,162,203 B1
(45) Date of Patent: Oct. 20, 2015

(54) HYDROGEN GENERATOR

(75) Inventors: Hiroshi Miyagawa, Aichi-gun (JP); Makoto Koike, Toyota (JP); Kiyoshi Yamazaki, Toyota (JP); Keiji Toh, Kariya (JP); Shohei Matsumoto, Kariya (JP); Tomojiro Sugimoto, Susono (JP); Rioh Shimizu, Mishima (JP); Susumu Kojima, Susono (JP)

(73) Assignee: KABUSHIKI KAISHA TOYOTA CHUO KENKYUSHO, Aichi-Gun (JP)

( * ) Notice: Subject to any disclaimer, the term of this patent is extended or adjusted under 35 U.S.C. 154(b) by 857 days.

(21) Appl. No.: 13/049,510

(22) Filed: Mar. 16, 2011

(51) Int. Cl.
*B01J 8/04* (2006.01)

(52) U.S. Cl.
CPC .......................................... *B01J 8/04* (2013.01)

(58) Field of Classification Search
USPC ......... 422/625, 628–630, 644, 650; 48/127.1, 48/127.9, 61
See application file for complete search history.

(56) References Cited

U.S. PATENT DOCUMENTS

| 6,267,792 | B1* | 7/2001 | Nagamiya et al. | 48/197 R |
| 6,390,030 | B1* | 5/2002 | Isogawa et al. | 123/3 |
| 8,904,760 | B2* | 12/2014 | Mital | 60/285 |
| 2004/0234827 | A1* | 11/2004 | Fujihara et al. | 429/20 |
| 2010/0173208 | A1* | 7/2010 | Hatada | 429/423 |

FOREIGN PATENT DOCUMENTS

JP   A-2009-179504   8/2009

* cited by examiner

*Primary Examiner* — Kaity Handal
(74) *Attorney, Agent, or Firm* — Oliff PLC

(57) ABSTRACT

A hydrogen generator into which a mixed gas is run and out of which a reformed gas including hydrogen is discharged, which can reliably control the hydrogen concentration in the reformed gas to a desired concentration. The hydrogen generator is provided with an upstream side oxidation unit and a downstream side decomposition unit, burns part of the compound in the mixed gas in the oxidation unit using the oxygen in the mixed gas so as to generate heat of combustion, and uses the heat of combustion to break down another part of the compound in the mixed gas in the decomposition unit so as to generate hydrogen. The hydrogen generator is provided with a first temperature sensor controller.

17 Claims, 2 Drawing Sheets

HYDROGEN GENERATOR

BACKGROUND OF THE INVENTION

1. Field of the Invention

The present invention relates to a hydrogen generator which generates hydrogen from a compound containing hydrogen atoms.

2. Description of the Related Art

When using hydrogen as fuel in a fuel cell etc. for vehicular use, it is difficult to mount a hydrogen storage tank in the vehicle since the storage volume of hydrogen is extremely large. Therefore, it has been proposed to mount a hydrogen generator for generating hydrogen from hydrocarbon fuel in the vehicle (see Japanese Patent Publication (A) No. 2009-179504).

This hydrogen generator is provided with an upstream side oxidation unit and a downstream side decomposition unit. By running a mixed gas of a compound containing hydrogen atoms such as hydrocarbons and air into it, the generator burns part of the compound in the oxidation unit using oxygen in the mixed gas to generate heat of combustion, utilizes this heat of combustion to break down part of the compound in the decomposition unit to generate hydrogen, and discharges reformed gas containing hydrogen.

As related art, there is Japanese Patent Publication (A) No. 2009-179504.

In the hydrogen generator, it is necessary to make the flow rate of the reformed gas discharged from the hydrogen generator the desired flow rate and also to make the hydrogen concentration in the reformed gas the desired concentration. For this reason, the hydrogen generator simultaneously controls the flow rates of the compound and the air which form the mixed gas flowing into the hydrogen generator. However, sometimes the intended flow rate of the compound or the intended flow rate of the air in the mixed gas flowing into the hydrogen generator are not realized. In this case, the hydrogen concentration in the reformed gas cannot be made the desired concentration.

SUMMARY OF THE INVENTION

Therefore, an object of the present invention is to provide a hydrogen generator, into which a mixed gas is run and out of which a reformed gas including hydrogen is discharged, which is provided with an upstream side oxidation unit and a downstream side decomposition unit, the mixed gas comprised of a mixture of a compound containing hydrogen atoms and oxygen or air, which burns part of the compound in the mixed gas in the oxidation unit using the oxygen in the mixed gas so as to generate the heat of combustion, and which utilizes this heat of combustion to break down another part of the compound in the mixed gas in the decomposition unit so as to generate hydrogen, wherein the hydrogen concentration in the reformed gas can be certainly controlled to the desired concentration.

According to one aspect of the present invention, the hydrogen generator is a hydrogen generator into which a mixed gas is run and out of which a reformed gas including hydrogen is discharged, which is provided with an upstream side oxidation unit and a downstream side decomposition unit, the mixed gas comprised of a mixture of a compound containing hydrogen atoms and oxygen or air, which burns part of the compound in the mixed gas in the oxidation unit using the oxygen in the mixed gas so as to generate heat of combustion, and which uses the heat of combustion to break down another part of the compound in the mixed gas in the decomposition unit so as to generate hydrogen, the hydrogen generator provided with a first temperature sensor which detects a temperature of the mixed gas immediately after passing through the oxidation unit and provided with a flow rate controller which controls at least one of a flow rate of the compound contained in the mixed gas flowing into the hydrogen generator and a flow rate of the oxygen or the air contained in the mixed gas so that the temperature of the mixed gas detected by the first temperature sensor becomes a set temperature in order that the hydrogen concentration of the reformed gas is controlled to a desired concentration.

According to one aspect of the present invention, the flow rate controller controls the flow rate of the oxygen or air, increases the flow rate of the oxygen or air when the temperature of the mixed gas detected by the first temperature sensor is lower than the set temperature, and decreases the flow rate of the oxygen or air when the temperature of the mixed gas detected by the first temperature sensor is higher than the set temperature.

According to one aspect of the present invention, the hydrogen generator is provided with a second temperature sensor for detecting a temperature in the decomposition unit at a downstream side from the first temperature sensor, wherein it is determined that the oxidation unit has deteriorated when the temperature in the decomposition unit detected by the second temperature sensor is higher than the temperature of the mixed gas detected by the first temperature sensor.

According to an aspect of the present invention, the hydrogen generator is provided with a third temperature sensor for detecting a temperature of the reformed gas immediately after passing through the decomposition unit, wherein it is determined that the decomposition unit has deteriorated when the temperature difference between the temperature of the mixed gas detected by the first temperature sensor and the temperature of the reformed gas detected by the third temperature sensor is a set temperature difference or less.

According to an aspect of the present invention, the compound is ammonia and the set temperature is made 1200° C. or less.

According to an aspect of the present invention, the set temperature is made 800° C.

Summarizing the advantageous effects of the present invention, there is provided a hydrogen generator into which a mixed gas is run and out of which a reformed gas including hydrogen is discharged, which is provided with an upstream side oxidation unit and a downstream side decomposition unit, the mixed gas comprised of a mixture of a compound containing hydrogen atoms and oxygen or air, which burns part of the compound in the mixed gas in the oxidation unit using the oxygen in the mixed gas so as to generate heat of combustion, and which uses the heat of combustion to break down another part of the compound in the mixed gas in the decomposition unit so as to generate hydrogen. The temperature of the mixed gas immediately after passing through the oxidation unit and the hydrogen concentration of the reformed gas passing through the decomposition unit are in a specific relationship regardless of the flow rate of the mixed gas. Due to this, if using the flow rate controller to control at least one of a flow rate of the compound in the mixed gas flowing into the hydrogen generator and a flow rate of the oxygen or the air contained in the mixed gas so that the temperature of the mixed gas immediately after passing through the oxidation unit detected by the first temperature sensor becomes the set temperature making the hydrogen concentration of the reformed gas passing through the decomposition unit the desired concentration, it is possible to reliably control the hydrogen concentration of the reformed gas to the desired concentration.

According to an aspect of the present invention, the flow rate controller controls the flow rate of oxygen or air, increases the flow rate of oxygen or air when the temperature of the mixed gas detected by the first temperature sensor is lower than the set temperature, and decreases the flow rate of oxygen or air when the temperature of the mixed gas detected by the first temperature sensor is higher than the set temperature, so it is possible to easily control the temperature of the mixed gas immediately after passing through the oxidation unit to the set temperature.

According to an aspect of the present invention, the hydrogen generator is provided with a second temperature sensor which detects the temperature in the decomposition unit at the downstream side from the first temperature sensor. When the temperature in the decomposition unit detected by the second temperature sensor is higher than the temperature of the mixed gas detected by the first temperature sensor, it means that the compound burns in the decomposition unit using the oxygen remaining in the mixed gas and the oxygen in the mixed gas cannot be sufficiently used for burning the compound in the oxidation unit, so it can be determined that the oxidation unit has deteriorated.

According to an aspect of the present invention, the hydrogen generator is provided with a third temperature sensor which detects the temperature of the reformed gas immediately after passing through the decomposition unit. When the temperature difference of the temperature of the mixed gas detected by the first temperature sensor and the temperature of the reformed gas detected by the third temperature sensor is a set temperature difference or less, it means that heat is not sufficiently absorbed from the mixed gas for breaking down the compound in the decomposition unit, so it can be determined that the decomposition unit has deteriorated.

According to an aspect of the present invention, the compound is ammonia and the set temperature does not exceed a heat resistance temperature of the oxidation unit, that is, 1200° C.

According to an aspect of the present invention, the set temperature is made 800° C. Due to this, it is possible to make the thermal degradation of the decomposition unit the minimum limit, break down the ammonia well in the decomposition unit, and make the hydrogen concentration in the reformed gas the desired concentration.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
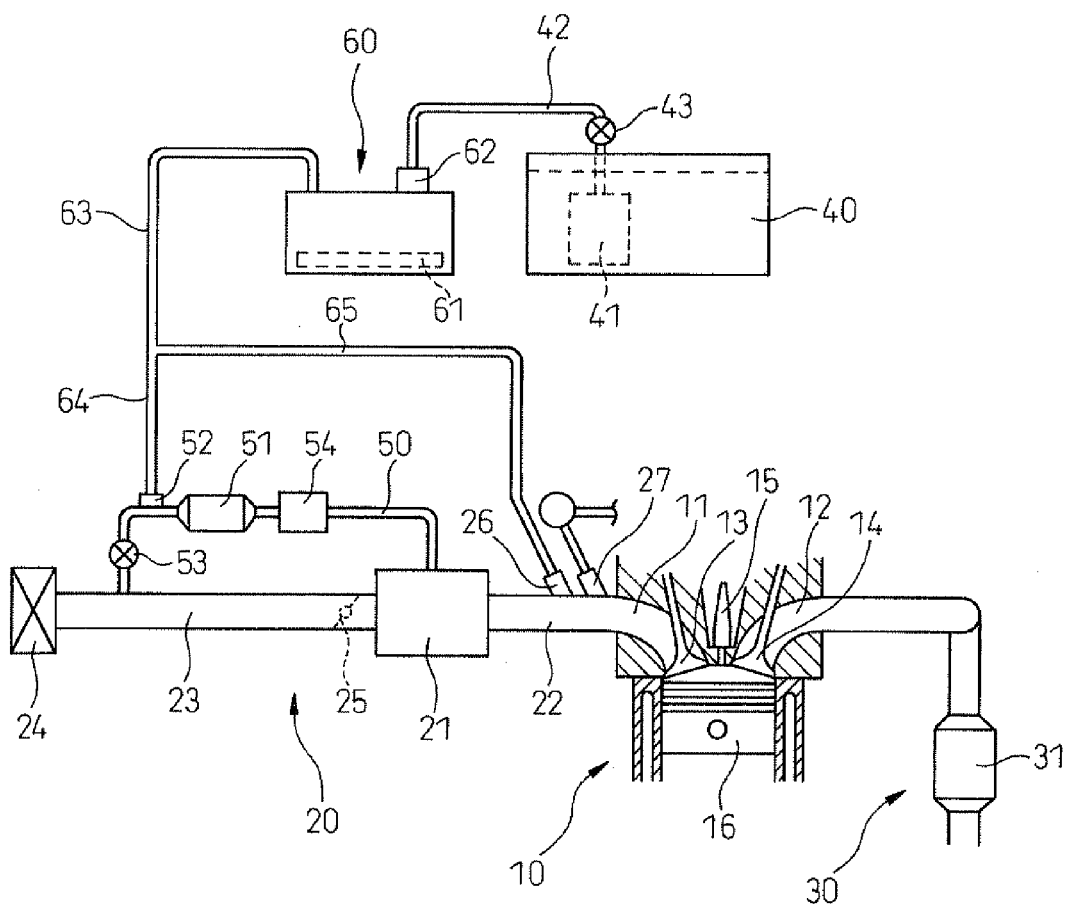
FIG. 1 is a schematic view of an internal combustion engine in which a hydrogen generator according to the present invention is mounted.

FIG. 1 is a schematic view of an internal combustion engine in which a hydrogen generator according to the present invention is mounted. This internal combustion engine uses ammonia as fuel not generating $CO_2$. The members of the internal combustion engine explained below are controlled by an electronic control unit (not shown). In the figure, 10 indicates an engine body, 20 an engine intake system, and 30 an engine exhaust system. In the engine intake system 20, 21 indicates a surge tank common to the cylinders, and 22 an intake runner positioned at a downstream side of the surge tank 21 and connected to an intake port 11 of each cylinder. Each intake runner 22 has an ammonia fuel injector 26 arranged in it for metering and feeding ammonia fuel into the cylinder. Reference numeral 23 indicates an intake passage positioned at an upstream side of the surge tank 21. At an upstream end, an air cleaner 24 is arranged. At the immediately upstream side of the surge tank 21 in the intake passage 23, a throttle valve 25 is arranged.

The engine exhaust system 30 is connected to the exhaust port 12 of each cylinder. Reference numeral 31 an exhaust purification system (for example three-way catalyst device) positioned in the engine exhaust system 30 at a downstream side from an exhaust header of the cylinders. In the engine body 10, 13 indicates an intake valve, 14 an exhaust valve, and 15 a spark plug, preferably a plasma jet type of spark plug, which injects a plasma jet to ignite and burn the air-fuel mixture in the cylinder at an ignition timing at the end of the compression stroke. Reference numeral 16 is a piston.

Reference numeral 40 is a storage tank of liquid ammonia. The storage tank 40 stores liquid ammonia of a high pressure of 0.8 MPa to 1.0 MPa or so. The liquid ammonia in the storage tank 40 is vaporized and fed as gaseous ammonia to the cylinder to form an air-fuel mixture with the intake air. However, this is harder to burn compared with a fossil fuel, so a hydrogen generator 51 is used to break down the ammonia, as the compound containing hydrogen atoms, into hydrogen and nitrogen to generate reformed gas containing hydrogen. Thus, the gaseous ammonia is fed into each cylinder together with reformed gas so as to utilize the hydrogen in the reformed gas as a combustion aid.

The hydrogen generator 51 is arranged in a bypass passage 50 communicating the intake passage 23 at an upstream side of the throttle valve 25 and the surge tank 21. In the bypass passage 50 at the immediately downstream side of the hydrogen generator 51, a cooling device 54 is arranged for cooling the reformed gas generated by the hydrogen generator 51 before it is fed to the surge tank 21. Further, in the bypass passage 50 at an upstream side of the hydrogen generator 51, an air pump 53 is arranged. This enables control of the amount of air fed to the hydrogen generator 51. When utilizing the negative pressure of intake air generated in the surge tank 21 to feed air to the hydrogen generator 51, a control valve is provided for controlling the amount of air instead of the air pump 53.

Reference numeral 60 indicates a heater-evaporator for liquid ammonia provided with a heater 61, while 62 indicates an ammonia injector for heater-evaporator use which meters and injects the liquid ammonia into the heater-evaporator 61. The heater 61 may be an electric heater or may utilize the heat of the exhaust gas, the heat of cooling water before being cooled by a radiator or the like.

Reference numeral 41 is a fuel pump arranged in the storage tank 40. This pumps liquid ammonia to the ammonia injector 62 for heater-evaporator use through the liquid ammonia pipe 42. The gaseous ammonia vaporized from the liquid ammonia in the heater-evaporator 60 passes through a first gaseous ammonia pipe 63, then on the one hand is fed through a second gaseous ammonia pipe 64 to the ammonia injector 52 for the mixed gas arranged at an upstream side of the hydrogen generator 51 of the bypass passage 50 and on the other hand is fed through a third gaseous ammonia pipe 65 to the ammonia fuel injector 26 of each intake runner 22.

Figure 2:
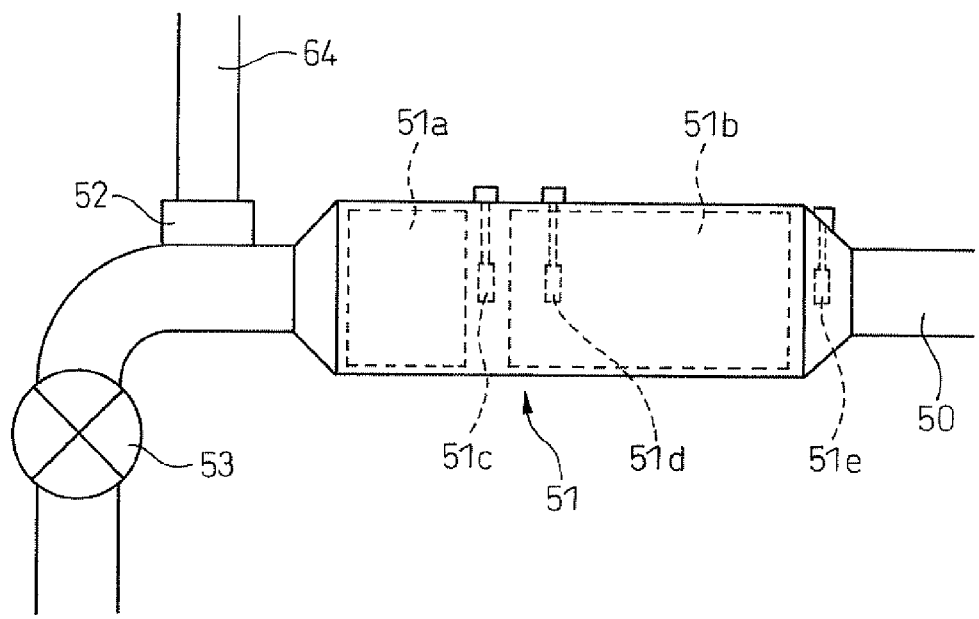
FIG. 2 is an enlarged view of the vicinity of the hydrogen generator of FIG. 1.

As shown in FIG. 2, inside the hydrogen generator 51, an upstream side oxidation unit 51a and a downstream side decomposition unit 51b are arranged. The mixed gas of ammonia and air flowing into the hydrogen generator 51 reliably passes through the oxidation unit 51a and the decomposition unit 51b. The oxidation unit 51a is comprised of a monolithic carrier on which an ammonia oxidation catalyst is carried, while the decomposition unit 51b is comprised of a monolithic carrier on which an ammonia decomposition catalyst is carried.

The ammonia oxidation catalyst can be made a platinum, ruthenium, palladium, rhodium, or other precious metal catalyst or an iron, cobalt, nickel, or other base metal catalyst. Further, the ammonia decomposition catalyst can be made a platinum, ruthenium, palladium, rhodium, or other precious metal catalyst or an iron, cobalt, nickel, tungsten, molybdenum, vanadium, or other base metal catalyst.

If the mixed gas of gaseous ammonia and air is fed to this hydrogen generator 51, at the upstream side oxidation unit 51a, as shown by the next formula (1), part of the gaseous ammonia is oxidized by the oxygen in the mixed gas for an exothermic reaction.

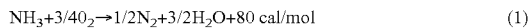

$$NH_3 + 3/4 O_2 \rightarrow 1/2 N_2 + 3/2 H_2O + 80 \text{ cal/mol} \quad (1)$$

Next, if, at the downstream side decomposition unit 51b, the heat of oxidation generated at the oxidation unit 51a is used and, as shown by the next formula (2), to break down another part of the gaseous ammonia into hydrogen and nitrogen.

$$NH_3 \rightarrow 1/2 N_2 \pm 3/2 H_2 - 11 \text{ cal/mol} \quad (2)$$

In this way, the hydrogen generator 51 having the oxidation unit 51a and the decomposition unit 51b can be used to generate reformed gas containing hydrogen from the mixed gas of ammonia and air without especially requiring any energy.

The reformed gas generated in the hydrogen generator 51 in this way is relatively high temperature (for example 500° C. or more). As it is, the hydrogen in the reformed gas sometimes burns by just being mixed with the intake air (in the present embodiment, sometimes burns in the surge tank 21) and is difficult to leave as a combustion aid in the cylinders at the ignition timing. Due to this, the reformed gas is cooled at the immediately downstream side of the hydrogen generator 51 by the cooling device 54 to at least less than 500° C. (preferably 80° C. or less).

The gaseous ammonia in the heater-evaporator 60 is monitored by the pressure sensor and temperature sensor (both not shown). A set pressure and a set temperature are maintained by adjusting the liquid ammonia pumped by the fuel pump 41 and fed from the ammonia injector 62 for heater-evaporator use to the inside of the heater-evaporator 60. For each engine operating state (the engine load and engine speed), the required amount of gaseous ammonia in the heater-evaporator 60 fed to each cylinder is determined and is metered by and fed from the ammonia fuel injector 26.

For example, the required amount of gaseous ammonia fed from the ammonia fuel injector 26 for each engine operating state is made the amount of ammonia burned using about 70% to 90% of the oxygen in the intake air in the stoichiometric air-fuel ratio operation and can be mapped based on the amount of intake air for each engine operating state. The remaining about 30% to 10% of oxygen in the intake air is used for making the hydrogen in the reformed gas (and when included, ammonia as well) burn without excess or shortfall. In this way, the required amount of gaseous ammonia fed from the ammonia injector 52 for the mixed gas may also be mapped based on the amount of intake air for each engine operating state. To maximize the hydrogen concentration (volume concentration) of the reformed gas (desired concentration about 40%), the mixing ratio of air and ammonia (molar ratio) is made about 0.8.

The hydrogen generator 51 feeds reformed gas to all cylinders through the surge tank 21, so the ammonia injector 52 for the mixed gas continuously feeds gaseous ammonia. The gaseous ammonia flow rate is set for each engine operating state. The air pump 53 has to control the air flow rate so that the molar ratio of the air and ammonia becomes 0.8 compared with the current gaseous ammonia flow rate. However, sometimes the intended gaseous ammonia flow rate or intended air flow rate is not realized in the mixed gas flowing into the hydrogen generator 51. In this case, it is not possible to make the hydrogen concentration in the reformed gas the desired concentration.

In the hydrogen generator 51 of the present embodiment, as shown in FIG. 2, a space is provided between the oxidation unit 51a and the decomposition unit 51b. In this space, a first temperature sensor 51c is arranged for detecting the temperature T1 of the mixed gas immediately after passing through the oxidation unit 51a.

Figure 3:
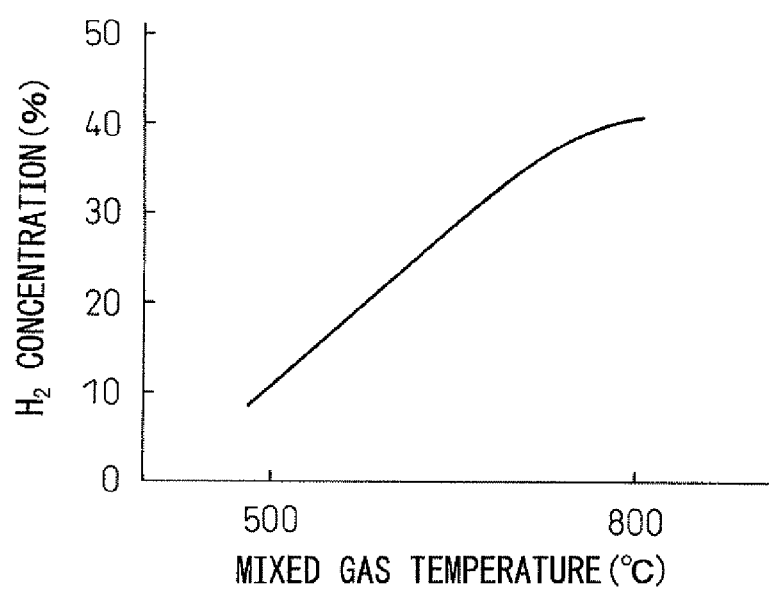
FIG. 3 is a graph showing a relationship of a temperature of a mixed gas flowing into a decomposition unit of the hydrogen generator and a hydrogen concentration in reformed gas flowing out from the decomposition unit.

FIG. 3 is a graph showing a relationship of a temperature of a mixed gas (gaseous ammonia and air) flowing into the decomposition unit 51b of the hydrogen generator 51 and a hydrogen concentration (volume concentration) in reformed gas flowing out from the decomposition unit 51b. Here, the hydrogen concentration in the reformed gas flowing out from the decomposition unit 51b has no relation with the flow rate of the mixed gas (mixed gas of gaseous ammonia and air from which oxygen is consumed) flowing into the decomposition unit 51b. This changes depending on the temperature of the mixed gas. The mixed gas flowing into the decomposition unit 51b rises in temperature by the oxidation unit 51a using almost all of the oxygen in the mixed gas to burn the ammonia in the mixed gas. Due to this, the greater the ratio of the amount of oxygen in the mixed gas flowing into the oxidation unit 51a is, the greater the ratio of the amount of ammonia made to burn in the oxidation unit 51a is, so the mixed gas flowing into the decomposition unit 51b becomes a higher temperature.

In this way, the present embodiment uses the air pump 53 as a flow rate controller to control the air flow rate contained in the mixed gas flowing into the hydrogen generator 51 such that the temperature T1 of the mixed gas immediately after passing through the oxidation unit 51a detected by the first temperature sensor 51c becomes the set temperature T (for example 800° C.) making the hydrogen concentration of the reformed gas passing through the decomposition unit the desired concentration (for example 40%). Due to this, it is possible to reliably control the hydrogen concentration of the reformed gas flowing out from the decomposition unit 51b to the desired concentration. In this case, if increasing the air flow rate, the ratio of the amount of ammonia burned in the oxidation unit 51a increases, so the temperature T1 of the mixed gas becomes higher. On the other hand, if decreasing the air flow rate, the ratio of the amount of ammonia burned in the oxidation unit 51a decreases, so the temperature T1 of the mixed gas becomes lower.

In the present embodiment, the mixed gas is made a combination of ammonia and air, but it may also be made a combination of ammonia and oxygen. In this case, like with the above-mentioned air flow rate, it is possible to control the oxygen flow rate contained in the mixed gas flowing to the hydrogen generator 51.

Further, it is also possible to use the ammonia injector 52 for the mixed gas as a flow rate controller to control the flow rate of gaseous ammonia contained in the mixed gas flowing into the hydrogen generator 51 so that the temperature T1 of the mixed gas immediately after passing through the oxidation unit 51a, detected by the first temperature sensor 51c, becomes the set temperature T (for example 800° C.) for making the hydrogen concentration of the reformed gas passing through the decomposition unit the desired concentration (for example 40%). Due to this, it is possible to reliably control the hydrogen concentration of the reformed gas flowing out from the decomposition unit 51b to the desired concentration.

In this case, if increasing the gaseous ammonia flow rate, the ratio of the amount of ammonia burned in the oxidation unit 51a decreases, so the temperature T1 of the mixed gas becomes lower. On the other hand, if decreasing the gaseous ammonia flow rate, the ratio of the amount of ammonia burned in the oxidation unit 51a increases, so the temperature T1 of the mixed gas becomes higher. However, the flow rate of gaseous ammonia fed by the ammonia injector 52 for the mixed gas is determined for each engine operating state, so changing it is not preferable. It is preferable to control the air flow rate by the air pump 53.

If raising the set temperature T for the mixed gas immediately after passing through the oxidation unit 51a, it is possible to raise the hydrogen concentration of the reformed gas, but thermal degradation of the decomposition unit 51b is promoted. Due to this, when ammonia is used as the compound containing hydrogen atoms, the set temperature T is preferably made 1200° C. or less. If made 800° C., the hydrogen concentration of the reformed gas can be made a relatively high 40% and thermal degradation of the decomposition unit 51b can be sufficiently suppressed.

In the hydrogen generator 51 of the present embodiment, a second temperature sensor 51d detecting the temperature in the decomposition unit 51b is arranged at the downstream side from the first temperature sensor 51c. The temperature T2 of the mixed gas (or reformed gas) in the decomposition unit 51b detected by the second temperature sensor 51d usually becomes lower than the temperature T1 of the mixed gas detected by the first temperature sensor 51c since an endothermic reaction occurs causing the decomposition unit Sib to break down the ammonia. However, when the temperature T2 in the decomposition unit 51b detected by the second temperature sensor 51d is higher than the temperature T1 of the mixed gas detected by the first temperature sensor 51c, it is considered that the ammonia in the mixed gas is burned in the decomposition unit 51b using the oxygen remaining in the mixed gas. This means that the oxygen in the mixed gas cannot be sufficiently used for burning the ammonia in the oxidation unit 51a, so it can be determined that the oxidation unit 51a has deteriorated.

Further, in the hydrogen generator 51 of the present embodiment, a third temperature sensor 51e is arranged for detecting the temperature of the reformed gas immediately after passing through the decomposition unit 51b. A sufficient endothermic reaction occurs for breaking down the ammonia at the decomposition unit 51b, so usually the temperature difference (T1−T3) between the temperature T1 of the mixed gas detected by the first temperature sensor 51c and the temperature T3 of the reformed gas passing through the decomposition unit 51b detected by the third temperature sensor 51e becomes relatively large. However, when the temperature difference (T1−T3) between the temperature T1 of the mixed gas detected by the first temperature sensor 51c and the temperature T3 of the reformed gas detected by the third temperature sensor 51e is a set temperature difference or less, a sufficient endothermic reaction does not occur from the mixed gas for cracking the ammonia in the decomposition unit 51b, so it can be determined that the decomposition unit Sib has deteriorated.

The hydrogen generator of the present embodiment was made one which generates hydrogen from ammonia as the compound containing hydrogen atoms, but of course it is possible to use any compound containing hydrogen atoms other than ammonia. For example, hydrocarbons can be used.

In this regard, in the internal combustion engine of FIG. 1, when good combustion cannot be obtained by the mixed gas of the gaseous ammonia and reformed gas, for example, when, like at the time of engine warmup where the cylinder temperature is low or the time of engine startup where the reformed gas cannot be immediately generated, the engine is operated using gasoline as fuel. This is done by arranging a gasoline fuel injector 27 for injecting gasoline at each intake runner 22.

While the invention has been described with reference to specific embodiments chosen for purpose of illustration, it should be apparent that numerous modifications could be made thereto by those skilled in the art without departing from the basic concept and scope of the invention.

The invention claimed is:

1. A hydrogen generator into which a mixed gas is run and out of which a reformed gas including hydrogen is discharged, the mixed gas including a mixture of a compound containing hydrogen atoms and oxygen or air, the hydrogen generator comprising:
   an upstream side oxidation unit,
   a downstream side decomposition unit,
   a first temperature sensor which detects a temperature of the mixed gas immediately after passing through the upstream side oxidation unit, the first temperature sensor being disposed in a space located between the upstream side oxidation unit and the downstream side decomposition unit, the space being a place where the upstream side oxidation unit and the downstream side decomposition unit do not exist,
   a flow rate controller, and
   an electronic control unit that controls the flow rate controller,
   wherein the oxygen of the mixed gas burns part of the compound in the mixed gas in the upstream side oxidation unit so as to generate heat of combustion, and the heat of combustion is used to break down another part of the compound in the mixed gas in the downstream side decomposition unit to generate hydrogen, and
   the electronic control unit, through controlling the flow rate controller, controls at least one of a flow rate of the compound contained in the mixed gas flowing into the hydrogen generator and a flow rate of the oxygen or the air contained in the mixed gas so that the temperature of the mixed gas detected by the first temperature sensor is maintained substantially constant at a set temperature, the set temperature being a temperature at which the hydrogen concentration of the reformed gas becoming a predetermined concentration, the set temperature being preset in the electronic control unit.

2. The hydrogen generator as set forth in claim 1, wherein the electronic control unit, through controlling the flow rate controller, increases the flow rate of the oxygen or air when the temperature of the mixed gas detected by the first temperature sensor is lower than the set temperature, and decreases the flow rate of the oxygen or air when the temperature of the mixed gas detected by the first temperature sensor is higher than the set temperature.

3. The hydrogen generator as set forth in claim 2, further comprising a second temperature sensor that detects a temperature in the downstream side decomposition unit at a downstream side from the first temperature sensor,
wherein it is determined that the upstream side oxidation unit has deteriorated when the temperature in the downstream side decomposition unit detected by the second temperature sensor is higher than the temperature of the mixed gas detected by the first temperature sensor.

4. The hydrogen generator as set forth in claim 2, further comprising a third temperature sensor that detects a temperature of the reformed gas immediately after passing through the downstream side decomposition unit,
wherein it is determined that the downstream side decomposition unit has deteriorated when the temperature difference between the temperature of the mixed gas detected by the first temperature sensor and the temperature of the reformed gas detected by the third temperature sensor is a set temperature difference or less.

5. The hydrogen generator as set forth in claim 4, wherein the compound is ammonia and the set temperature is 1200° C. or less.

6. The hydrogen generator as set forth in claim 2, wherein the compound is ammonia and the set temperature is 1200° C. or less.

7. The hydrogen generator as set forth in claim 3, further comprising a third temperature sensor that detects a temperature of the reformed gas immediately after passing through the downstream side decomposition unit,
wherein it is determined that the downstream side decomposition unit has deteriorated when the temperature difference between the temperature of the mixed gas detected by the first temperature sensor and the temperature of the reformed gas detected by the third temperature sensor is a set temperature difference or less.

8. The hydrogen generator as set forth in claim 3, wherein the compound is ammonia and the set temperature is 1200° C. or less.

9. The hydrogen generator as set forth in claim 7, wherein the compound is ammonia and the set temperature is 1200° C. or less.

10. The hydrogen generator as set forth in claim 1, further comprising a second temperature sensor that detects a temperature in the downstream side decomposition unit at a downstream side from the first temperature sensor,
wherein it is determined that the upstream side oxidation unit has deteriorated when the temperature in the downstream side decomposition unit detected by the second temperature sensor is higher than the temperature of the mixed gas detected by the first temperature sensor.

11. The hydrogen generator as set forth in claim 10, further comprising a third temperature sensor that detects a temperature of the reformed gas immediately after passing through the downstream side decomposition unit,
wherein it is determined that the downstream side decomposition unit has deteriorated when the temperature difference between the temperature of the mixed gas detected by the first temperature sensor and the temperature of the reformed gas detected by the third temperature sensor is a set temperature difference or less.

12. The hydrogen generator as set forth in claim 10, wherein the compound is ammonia and the set temperature is 1200° C. or less.

13. The hydrogen generator as set forth in claim 11, wherein the compound is ammonia and the set temperature is 1200° C. or less.

14. The hydrogen generator as set forth in claim 1, further comprising a third temperature sensor that detects a temperature of the reformed gas immediately after passing through the downstream side decomposition unit,
wherein it is determined that the downstream side decomposition unit has deteriorated when the temperature difference between the temperature of the mixed gas detected by the first temperature sensor and the temperature of the reformed gas detected by the third temperature sensor is a set temperature difference or less.

15. The hydrogen generator as set forth in claim 14, wherein the compound is ammonia and the set temperature is 1200° C. or less.

16. The hydrogen generator as set forth in claim 1, wherein the compound is ammonia and the set temperature is 1200° C. or less.

17. The hydrogen generator as set forth in claim 16, wherein the set temperature is 800° C.

* * * * *